(12) United States Patent
Tsirkin et al.

(10) Patent No.: US 10,318,329 B2
(45) Date of Patent: Jun. 11, 2019

(54) DRIVER SWITCH FOR LIVE MIGRATION WITH AN ASSIGNED DEVICE

(71) Applicant: Red Hat Israel, Ltd., Ra'anana (IL)

(72) Inventors: Michael Tsirkin, Westford, MA (US); Amnon Ilan, Ra'anana (IL)

(73) Assignee: RED HAT ISRAEL, LTD., Ra'anana (IL)

( * ) Notice: Subject to any disclaimer, the term of this patent is extended or adjusted under 35 U.S.C. 154(b) by 289 days.

(21) Appl. No.: 15/232,145

(22) Filed: Aug. 9, 2016

(65) Prior Publication Data

US 2018/0046483 A1 Feb. 15, 2018

(51) Int. Cl.
G06F 9/455 (2018.01)

(52) U.S. Cl.
CPC .. G06F 9/45558 (2013.01); *G06F 2009/4557* (2013.01); *G06F 2009/45579* (2013.01)

(58) Field of Classification Search
CPC ........................... G06F 9/45558; G06F 9/4856
USPC ........................................................ 711/6, 165
See application file for complete search history.

(56) References Cited

U.S. PATENT DOCUMENTS

| | | | |
|---|---|---|---|
| 8,146,082 B2 | 3/2012 | Belay | |
| 8,281,013 B2 | 10/2012 | Mundkur et al. | |
| 8,327,060 B2 * | 12/2012 | Heim | G06F 9/4856 711/165 |
| 8,356,120 B2 | 1/2013 | Tsirkin et al. | |
| 8,489,699 B2 | 7/2013 | Goggin et al. | |
| 8,533,713 B2 | 9/2013 | Dong | |
| 8,789,069 B2 | 7/2014 | Green et al. | |
| 2009/0007099 A1 | 1/2009 | Cummings et al. | |
| 2010/0250824 A1* | 9/2010 | Belay | G06F 9/45558 711/6 |
| 2013/0055254 A1 | 2/2013 | Avasthi et al. | |

OTHER PUBLICATIONS

Zhai et al., Live Migration with Pass-through Device for Linux VM, Intel Corp., 2008, Link: andley.net/kdocs/ols/2008/ols2008v2-pages-261-267.pdf.
Lan, Msg01519—Re: [Qemu-Devel] Live Migration vs Device Assignment (Motivation), Dec. 2015, Link: lists.gnu.org/archive/html/qemu-devel/2015-12/msg01519.html.
Gilbert, Msg01556—Re: [Qemu-Devel] Live Migration vs Device Assignment (Motivation), Dec. 2015, Link: lists.gnu.org/archive/html/qemu-devel/2015-12/msg01556.html.

* cited by examiner

*Primary Examiner* — Eric C Wai
(74) *Attorney, Agent, or Firm* — K&L Gates LLP (57) ABSTRACT

A migration system includes a memory, a physical processor in communication with the memory, a first device, a second device, a first hypervisor at a source location, a second hypervisor at a destination location, a first virtual machine, and a second virtual machine. The first virtual machine includes a guest OS executing on the first hypervisor and a guest driver and the second virtual machine includes the guest OS executing on the second hypervisor and the guest driver. The first and second hypervisors send a request to save a device state to the guest driver in the guest OS executing on the first hypervisor and send a migration notification to the guest OS executing on the second hypervisor. The guest driver saves a state signature in the memory. The guest driver determines a status of the state signature as one of matching the second device and mismatching the second device.

20 Claims, 6 Drawing Sheets

DRIVER SWITCH FOR LIVE MIGRATION WITH AN ASSIGNED DEVICE

BACKGROUND

Computer systems may employ virtual machines including one or more guest operating systems (OS). A virtual machine (VM) is a software implementation of a computer that executes programs in a way similar to a physical machine. The virtual machine may share underlying physical hardware resources between different virtual machines. Each virtual machine may be associated with a physical device, such as a hardware device and/or an assigned device. A virtual machine may include a virtual device that serves as a pass-through device to the physical device, and the virtual machine may perform tasks associated with the functions of the physical device and/or related to the associated physical device. Additionally, virtual machines may be stopped and resumed and/or migrated to various physical machines with differing configurations of physical hardware resources.

SUMMARY

The present disclosure provides new and innovative systems and methods of live migration with an assigned device. In an example embodiment, a system includes a memory, one or more physical processors in communication with the memory, a first device, a second device, a first hypervisor, a second hypervisor, a first virtual machine, and a second virtual machine. The first hypervisor executes on the one or more physical processors and is located at a migration source location. The second hypervisor executes on the one or more physical processors and is located at a migration destination location. Before migration, the first virtual machine includes a guest OS executing on the first hypervisor and a guest driver in the guest OS executing on the first hypervisor. After migration, the second virtual machine includes the guest OS executing on the second hypervisor and the guest driver in the guest OS executing on the second hypervisor. The first hypervisor executes on the one or more physical processors to send a request to save a device state to the guest driver in the guest OS executing on the first hypervisor. The device state is associated with the first device on the first virtual machine. The second hypervisor executes on the one or more physical processors to send a migration notification to the guest OS executing on the second hypervisor. The guest driver in the guest OS executing on the first hypervisor receives the request from the first hypervisor and save a state signature in the memory. The state signature includes a device signature of the first device attached to the device state of the first device. The guest driver in the guest OS executing on the second hypervisor determines a status of the state signature as one of matching the second device and mismatching the second device.

In an example embodiment, a method includes sending, before migration, by a first hypervisor, a request to save a device state to a guest driver in a guest OS executing on the first hypervisor. The device state is associated with a first device on a first virtual machine, and the first virtual machine is located at a migration source location. Before migration, the guest driver in the guest OS executing on the first hypervisor receives the request from the first hypervisor and saves a state signature in a first memory. The state signature includes a device signature of the first device attached to the device state. After migration, the second hypervisor sends a migration notification to a guest OS executing on the second hypervisor. Additionally, after migration, the guest OS executing on the second hypervisor receives the migration notification and the guest driver in the guest OS executing on the second hypervisor determines whether the state signature is a match or a mismatch with a second device on a second virtual machine.

In an example embodiment, a non-transitory machine readable medium stores a program, which when executed by a processor, causes a guest OS including a guest driver to receive, before migration, by a guest driver in the guest OS executing on a first hypervisor, a request from the first hypervisor to save a device state. The device state is associated with a first device on the first virtual machine, and the first virtual machine is located at a migration source location. The guest driver in the guest OS executing on the first hypervisor saves a state signature of the first device in a first memory before migration. The state signature includes a device signature attached to the device state. After migration, the guest OS executes on a second hypervisor to receive a migration notification from the second hypervisor, and the guest driver in the guest OS executing on the second hypervisor determines a status of the state signature as one of matching and mismatching with a second device on a second virtual machine. The second virtual machine is located at a migration destination location. Responsive to determining the status of the state signature as matching, the guest driver in the guest OS executing on the second hypervisor loads, after migration, the device state to the second device, and responsive to determining the status of the state signature as mismatching, the guest OS executing on the second hypervisor reinitializes, after migration, the second device on the second virtual machine at the migration destination.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing a driver switch for live migration with an assigned device. Assigned devices have varying hardware, firmware, memory sizes, etc. Current techniques for live migration with an assigned device typically involve fully removing any assigned devices from the guest OS and discarding the driver and/or state (e.g., device state and device signature). Then, the device state is recreated after the device is re-added after migration. However, these techniques are generally expensive and result in additional downtime. For example, device profiles may need to be recreated after migration before the system resumes operating as it was before migration. To reduce overhead and downtime, the device state may be stored in memory such that if the virtual machine is migrated to another identical host OS, the device state may be restored from memory at the destination location. However, often times the host OS at the migration destination location is not identical to the host OS at the migration source location. Additionally, devices may typically vary slightly by way of build versions, vendors, and/or updates. For example, in ten PCI cards, each PCI card may have slightly different hardware and firmware versions such that a saved device state on one device and/or host OS may not work well on another device and/or host OS.

As discussed in the various example embodiments disclosed herein, to decrease downtime and improve efficiency of migrating varying devices on host OSes that may not be identical to the host OS at the migration source location, a guest device driver may be used to detect a mismatch in the device state and enable the guest OS to recover (e.g., reinitialize the device) to ensure that the system functions properly. This advantageously allows for efficient migration and prevents issues that may arise due to varying differences between devices and/or host OSes. For example, loading the device state from memory without checking for a match may result in wasted resources in each case of a mismatch, as the device may need to be reinitialized for a successful migration. Specifically, in the case of a mismatching devices on the migration source location and the migration destination location, the guest OS may crash. On the other hand, reinitializing every device after migration consumes additional resources in each case of a match because the device state may have been loaded from memory resulting in a quicker and more efficient migration. Thus, the techniques described herein advantageously enables migration for both matched and mismatched devices while avoiding crashing the guest OS and the additional overhead associated with recreating a device state or reinitializing a device for each instance of migration.

Figure 1A:
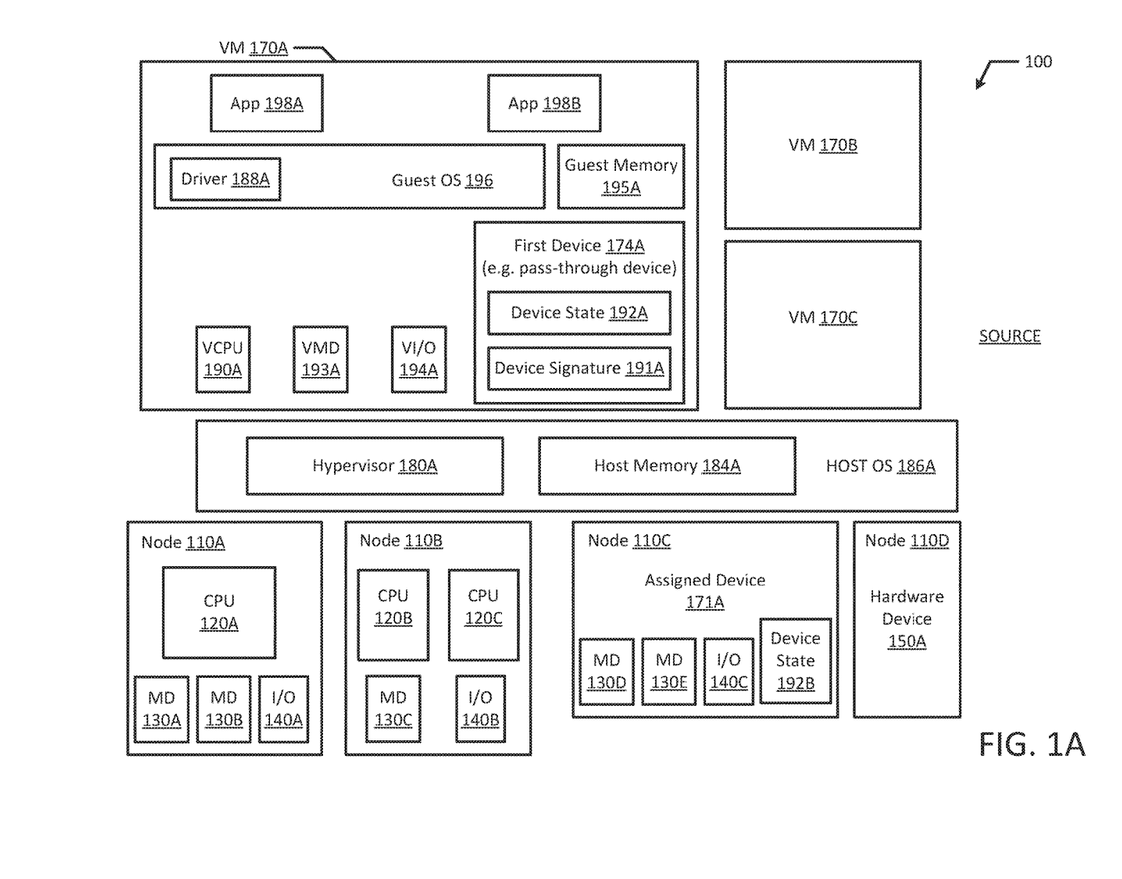
FIG. 1A illustrates a block diagram of an example migration system at a migration source location according to an example embodiment of the present disclosure.

FIG. 1A depicts a high-level component diagram of an example migration system 100 at a migration source location in accordance with one or more aspects of the present disclosure. The migration system 100 may include a memory (e.g., MD 130A-E), one or more physical processors in communication with the memory (e.g., CPU 120A-C), one or more virtual machines (e.g., VM 170A-C), and a hypervisor (e.g., hypervisor 180A).

The virtual machines 170A-C may include a guest OS, guest memory, a virtual CPU (VCPU), virtual memory devices (VMD), and virtual input/output devices (VI/O). For example, virtual machine 170A may include Guest OS 196, guest memory 195A, a virtual CPU 190A, a virtual memory devices 192A, and virtual input/output device 194A. In an example embodiment, a first virtual machine (e.g., VM 170A) may include a first device 174A. For example, the first device 174A may be a pass-through device that is virtualized or emulated by the hypervisor 180A. The first device 174A may be associated with an assigned device 171A. The first device 174A may include a device state 192A and a device signature 191A. Guest memory (e.g., Guest Memory 195A) may include one or more memory pages.

As noted above, migration system 100 may run multiple virtual machines (e.g., VM 170A-C), by executing a software layer (e.g., hypervisor 180A) above the hardware and below the virtual machines 170A-C, as schematically shown in FIG. 1. In an example embodiment, the hypervisor 180A may be a component of the host operating system 186A executed by the migration system 100. In another example embodiment, the hypervisor 180A may be provided by an application running on the operating system 186A, or may run directly on the migration system 100 without an operating system beneath it. The hypervisor 180A may virtualize the physical layer, including processors, memory, and I/O devices, and present this virtualization to virtual machines 170A-C as devices, including virtual processors (e.g., VCPU 190A), virtual memory devices (e.g., VMD 193A), and/or virtual I/O devices (e.g., VI/O 194A). It should be appreciated that VM 170B and VM 170C may include one or more VCPUs, VMDs, and/or VI/O devices.

Figure 1B:
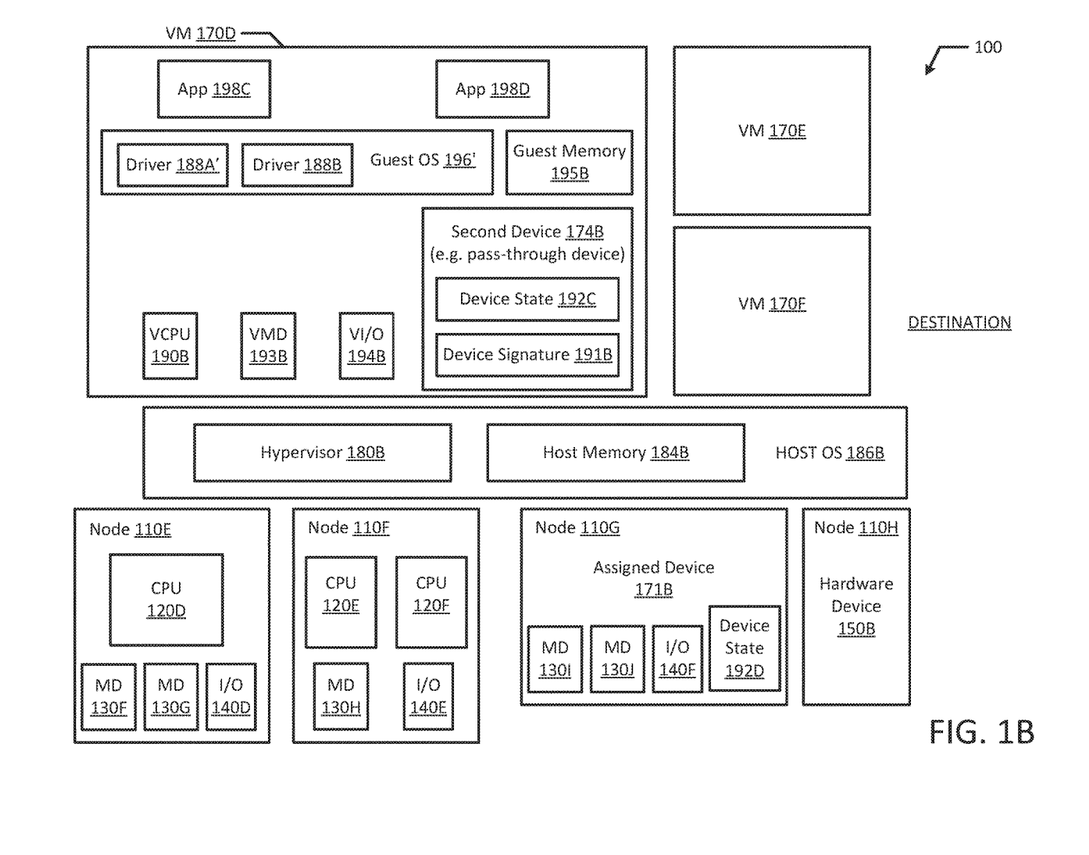
FIG. 1B illustrates a block diagram of an example migration system at a migration destination location according to an example embodiment of the present disclosure.

In an example embodiment, a virtual machine 170A may execute a guest operating system 196 which may utilize the underlying VCPU 190A, VMD 193A, and VI/O device 194A. One or more applications 198A-B may be running on a virtual machine 170A under the respective guest operating system 196. A virtual machine (e.g., VM 170A-F, as illustrated in FIGS. 1A and 1B) may run on any type of dependent, independent, compatible, and/or incompatible applications on the underlying hardware and OS (e.g., host OS 186A-B). In an example embodiment, applications (e.g., App 198A-B) run on a virtual machine 170A may be dependent on the underlying hardware and/or OS 186A. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications run on a second virtual machine (e.g., VM 170B) are independent of the underlying hardware and/or OS 186A. Additionally, applications 198A-B run on a virtual machine 170A may be compatible with the underlying hardware and/or OS 186A. In an example embodiment, applications 198A-B run on a virtual machine 170A may be incompatible with the underlying hardware and/or OS 186A. For example, applications 198A-B run on one virtual machine 170A may be compatible with the underlying hardware and/or OS 186A while applications run on another virtual machine 170B are incompatible with the underlying hardware and/or OS 186A. In an example embodiment, a device may be implemented as a virtual machine (e.g., virtual machine 170A-F).

The hypervisor 180A may manage host memory 184A for the host operating system 186A as well as memory allocated to the virtual machines 170A-B and guest operating systems 196 such as guest memory 195A provided to guest OS 196. Host memory 184A and guest memory 195A may be divided into a plurality of memory pages that are managed by the hypervisor 180A. Guest memory 195A allocated to the guest OS 196 may be mapped from host memory 184A such that when a guest application 198A-B uses or accesses a memory page of guest memory 195A it is actually using or accessing host memory 184A.

The migration system 100, at the migration source location, may include one or more interconnected nodes 110A-D. Each node 110A-B may in turn include one or more physical processors (e.g., CPU 120A-C) communicatively coupled to memory devices (e.g., MD 130A-C) and input/output devices (e.g., I/O 140A-B). Nodes 110C-D may include a device such as an assigned device 171A or a hardware device 150A. In an example embodiment, a hardware device (e.g., 150A) and/or an assigned device 171A may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The Nodes 110C-D may include one ore more physical processors communicatively coupled to memory devices (e.g., MD 130D-E) and input/output devices (e.g., I/O 140C). Additionally, Node 110C may be an assigned device 171A with a device state 192B. For example, device states 192A-B may both be associated with the first device 174A because the first device 174A may serve as a pass-through device that may be associated with assigned device 171A.

FIG. 1B depicts a high-level component diagram of the example migration system 100 at a migration destination location in accordance with one or more aspects of the present disclosure. The migration system 100 may include a memory (e.g., MD 130F-H), one or more physical processors in communication with the memory (e.g., CPU 120D-F), one or more virtual machines (e.g., VM 170D-F), and a hypervisor (e.g., hypervisor 180B).

The virtual machines 170D-F may include a guest OS, guest memory, a virtual CPU (VCPU), virtual memory devices (VMD), and virtual input/output devices (VI/O). For example, virtual machine 170D may include Guest OS 196' (e.g., the migrated Guest OS 196), guest memory 195B, a virtual CPU 190B, a virtual memory devices 192B, and virtual input/output device 194B. In an example embodiment, a second virtual machine (e.g., VM 170D) may include a second device 174B. For example, the second device 174B may be a pass-through device that is virtualized or emulated by the second hypervisor 180B. The second device 174B may be associated with assigned device 171B. The second device 174B may include a device state 192C and a device signature 191B. Guest memory (e.g., Guest Memory 195B) may include one or more memory pages.

As noted above, migration system 100 may run multiple virtual machines (e.g., VM 170D-F), by executing a software layer (e.g., hypervisor 180B) above the hardware and below the virtual machines 170D-F, as schematically shown in FIG. 1B. In an example embodiment, the hypervisor 180B may be a component of the host operating system 186B executed by the migration system 100. In another example embodiment, the hypervisor 180B may be provided by an application running on the operating system 186B, or may run directly on the migration system 100 without an operating system beneath it. The hypervisor 180B may virtualize the physical layer, including processors, memory, and I/O devices, and present this virtualization to virtual machines 170D-F as devices, including virtual processors (e.g., VCPU 190B), virtual memory devices (e.g., VMD 193B), and/or virtual I/O devices (e.g., VI/O 194B). It should be appreciated that VM 170E and VM 170F may include one or more VCPUs, VMDs, and/or VI/O devices.

In an example embodiment, a virtual machine 170D (hereinafter, virtual machine 170) may execute a guest operating system 196' which may utilize the underlying VCPU 190B, VMD 193B, and VI/O device 194B. One or more applications 198C-D may be running on a virtual machine 170D under the respective guest operating system 196'. The hypervisor 180B may manage host memory 184B for the host operating system 186B as well as memory allocated to the virtual machines 170D-F and guest operating systems 196' such as guest memory 195B provided to guest OS 196'. Host memory 184B and guest memory 195B may be divided into a plurality of memory pages that are managed by the hypervisor 180B. Guest memory 195B allocated to the guest OS 196' may be mapped from host memory 184B such that when a guest application 198C-D uses or accesses a memory page of guest memory 195B it is actually using or accessing host memory 184B.

The migration system 100, at the migration destination location, may include one or more interconnected nodes 110E-F. Each node 110E-F may in turn include one or more physical processors (e.g., CPU 120D-F) communicatively coupled to memory devices (e.g., MD 130F-H) and input/output devices (e.g., I/O 140D-E). Nodes 110G-H may include a device such as an assigned device 171B or a hardware device 150B. In an example embodiment, a hardware device (e.g., 150B) and/or an assigned device 171B may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. The Nodes 110G-H may include one ore more physical processors communicatively coupled to memory devices (e.g., MD 1301-J) and input/output devices (e.g., I/O 140F). Additionally, Node 110G may be an assigned device 171B with a device state 192D. For example, device states 192C-D may both be associated with the second device 174B because the second device 174B may serve as a pass-through device that may be associated with assigned device 171B.

As used herein, a physical processor or a processor 120A-F refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-H refers to a volatile or non-volatile memory device, such as RAM, ROM, EEPROM, or any other device capable of storing data. As discussed herein, I/O device 140A-E refers to a device capable of providing an interface between one or more processor pins and an external device capable of inputting and/or outputting binary data.

Processors 120A-F may be interconnected using a variety of techniques, ranging from a point-to-point processor interconnect, to a system area network, such as an Ethernet-based network. Local connections within each node and/or between nodes, including the connections between a processor 120A-F and a memory device 130A-J and between a processor 120A-F and an I/O device 140A-F, may be provided by one or more local buses of suitable architecture, for example, peripheral component interconnect (PCI).

Figure 2:
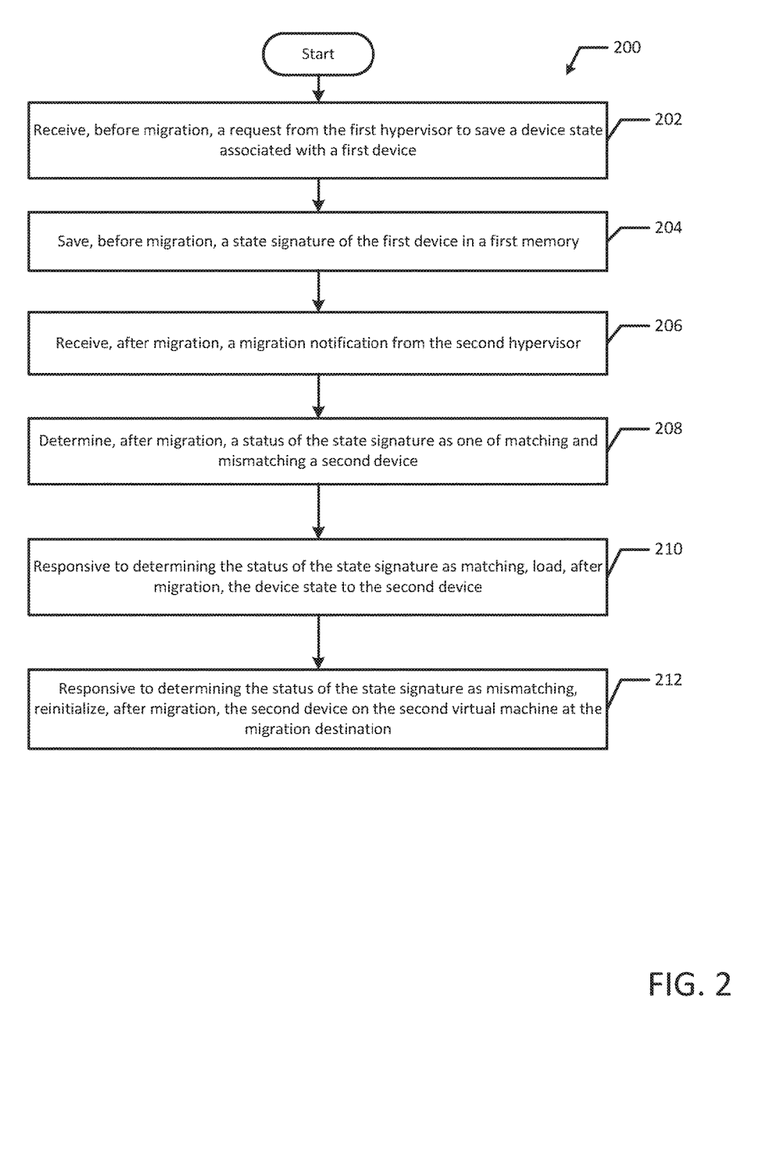
FIG. 2 illustrates a flowchart of an example process for virtual machine migration according to an example embodiment of the present disclosure.

FIG. 2 illustrates a flowchart of an example method 200 for virtual machine migration in accordance with an example embodiment of the present disclosure. Although the example method 200 is described with reference to the flowchart illustrated in FIG. 2, it will be appreciated that many other methods of performing the acts associated with the method 200 may be used. For example, the order of some of the blocks may be changed, certain blocks may be combined with other blocks, and some of the blocks described are optional. The method 200 may be performed by processing logic that may comprise hardware (circuitry, dedicated logic, etc.), software, or a combination of both.

The example method 200 includes receiving a request from a first hypervisor to save a device state associated with a first device before migration (block 202). For example, a guest OS 196 executing on a first hypervisor 180A may receive a request from the first hypervisor 180A to save a device state 192A associated with a first device 174A before migration. The first device 174A may serve as a pass-through device that may be associated with assigned device 171A and the device state 192A may be the same as the device state 192B. In an example embodiment, a first guest driver 188A in a guest OS 196 executing on a first hypervisor 180A may receive a request from the first hypervisor 180A to save a device state 192A associated with a first device 174A before migration. Then, example method 200 saves a state signature of the first device in a first memory before migration (block 204). For example, the guest OS 196 executing on the first hypervisor 180A may save a state signature of the first device 174A in a first memory (e.g., guest memory 195A) before migration. In an example embodiment, the first guest driver 188A in the guest OS 196 executing on a first hypervisor 180A may save a state signature of the first device 174A in a first memory before migration.

Then, example method 200 receives a migration notification from the second hypervisor after migration (block 206). For example, the guest OS 196' executing on a second hypervisor 180B may receive a migration notification from the second hypervisor 180B after migration. In an example embodiment, the hypervisor 180B may send the guest OS 196' a message including instructions related to migrating the associated virtual machine (e.g., virtual machine 170A) from a migration source location to a migration destination location. In another example embodiment, the guest OS 196' may unbind the guest driver 188A' in the guest OS 196' executing on the second hypervisor 180B from the first device 174A. For example, the guest driver 188A' may be associated with the first device 174A and the assigned device 171A. Once the system migrates the virtual machine 170A to the migration destination location, the assigned device 171A may no longer have reason to be bound to guest driver 188A'.

Then, example method 200 determines a status of the state signature as one of matching and mismatching a second device after migration (block 208). For example, the guest OS 196' executing on the second hypervisor 180B may determine a status of the state signature as one of matching and mismatching a second device 174B after migration. In an example embodiment, guest driver 188A' in the guest OS 196' executing on the second hypervisor 180B may determine the status of the state signature as one of matching and mismatching the second device 174B after migration. Additionally, the guest driver 188A' may notify the guest OS 196' of the status of the state signature as mismatching. Responsive to determining the status of the state signature as matching, example method 200 loads the device state to the second device (block 210). For example, the guest OS 196' executing on the second hypervisor 180B may load the device state 192A to the second device 174B. The device state 192A may be the same as device state 192B or may be similar to device state 192B. In an example embodiment, the guest driver 188A' in the guest OS 196' executing on the second hypervisor 180B may load the device state 192A to the second device 174B. For example, the second device 174B and the associated assigned device 171B may have the same device state as the first device 174A (e.g., device states 174A-D are the same). Responsive to determining the status of the state signature as mismatching, example method 200 reinitializes the second device on the second virtual machine at the migration destination (block 212). For example, the guest OS 196' may reinitialize the second device 174B on the second virtual machine 170D at the migration destination. The second device 174B may be reinitialized such that the guest OS 196' may resume operation with the newly loaded device states 192C-D.

In an example embodiment, the guest OS 196' executing on the second hypervisor 170D may bind the guest driver 188A' to the second device 174B. For example, in the case of matching, the guest OS 196' may bind guest driver 188A' to the second device 174A (associated with assigned device 171A) because the guest driver 188A' (e.g., migrated driver 188A) is configured to work with the second devices (e.g., second device 174B and assigned device 171B) because they have matching state signatures with the original devices (e.g., first device 174A and assigned device 171A). Additionally, the guest OS 196' executing on the second hypervisor 170D may bind a different driver (e.g., driver 188B) to the second device 174A. For example, the guest OS 196' may decide to use a driver (e.g., driver 188B) that is compatible with multiple devices. In another example embodiment, the guest OS 196' may bind a different driver (e.g., driver 188B) in the case of mismatching to ensure that the proper guest driver is used with the second device 174B and the associated assigned device 171B.

In another example embodiment, the guest OS 196' executing on the second hypervisor 170D may unload the guest driver 188A' from memory (e.g., guest memory 195B). For example, on mismatch, a different guest driver may be used and the guest OS 196' may load the different guest driver in the memory (e.g., guest memory 195B). Then, the guest driver may be used with the second device 174B and the associated assigned device 171B.

Figure 3:
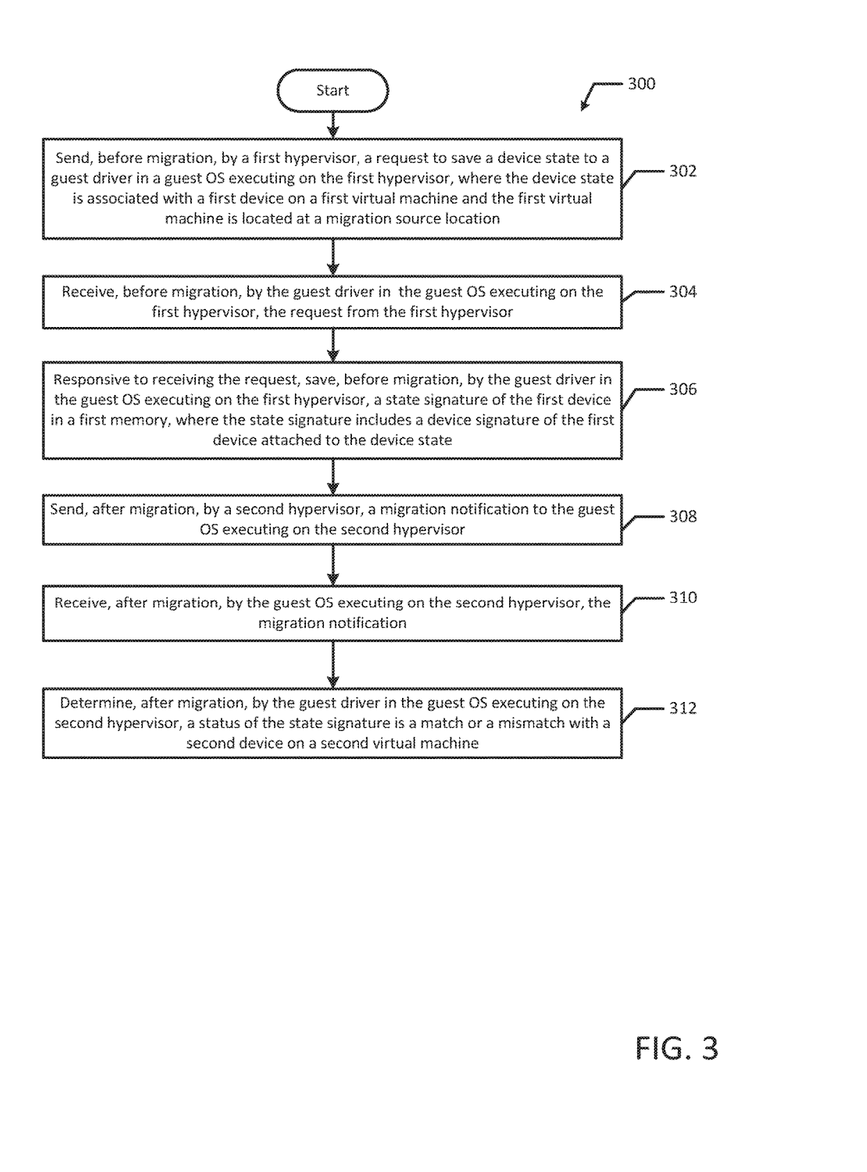
FIG. 3 illustrates a flowchart of an example process for virtual machine migration according to an example embodiment of the present disclosure.

FIG. 3 illustrates a flowchart of an example method 300 for virtual machine migration in accordance with an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

In the illustrated embodiment, a first hypervisor 170A may send a request to save a device state 192A and/or device state 192B to a guest driver 188A in a guest OS 196 executing on the first hypervisor before migration (block 302). In an example embodiment, the device state 192A of the first device 174A may be associated with an assigned device 171A. For example, the first device 174A may be a virtual device exposed to the guest OS 196 and may be a pass-through device associated with the assigned device 171A on the host OS 186A. Responsive to the first hypervisor 170A sending the request, the guest driver 188A in the guest OS 196 executing on the first hypervisor 170A may receive the request from the first hypervisor 170A before migration (block 304). In an example embodiment, the request may be sent directly to the guest driver 188A. In another example embodiment, the request may be sent to the guest OS 196, which may then forward the request to the guest driver 188A. Then, the guest driver 188A in the guest OS 196 executing on the first hypervisor 170A may save a state signature of the first device 174A in a first memory before migration (block 306). For example, the state signature of the first device 174A may include the device signature 191A attached to the device state 192A of the first device 174A. In an example embodiment, the state signature and/or the device signature 191A of the first device 174A may include a hardware device ID, a firmware device ID, a vendor ID and/or a version. Additionally, the state signature may include a hash function, a list of loaded firmware and/or a memory size of the first device 174A and/or the associated assigned device 171A.

A second hypervisor 180B may send a migration notification to the guest OS 196' executing on the second hypervisor 180B after migration (block 308). For example, the guest OS 196 may migrate from a migration source location to a migration destination location (illustrated as guest OS 196' in FIG. 1B). The migrated guest OS 196' is depicted in virtual machine 170D. In an example embodiment, virtual machine 170D may be a newly loaded virtual machine or may be the migrated virtual machine 170A. Additionally, the second hypervisor 180B may send the migration notification to the guest OS 196' as soon as the guest OS 196 has migrated to the migration destination location. For example, the second hypervisor 180B may detect that VM 170A and the guest OS 196 have migrated to the migration destination location and then may send the migration notification. Then, the guest OS 196' executing on the second hypervisor 180B may receive the migration notification after migration (block 310). In an example embodiment, the migration notification may include instructions to perform additional operations after migration.

The guest driver 188A' in the guest OS 196' executing on the second hypervisor 180B may determine whether the state signature is a match or a mismatch with a second device 174B on a second virtual machine 170D after migration (block 312). For example, the guest driver 188A' may check the state signature of the second device 174B against the state signature of the first device 174A (e.g., device signature 191A and device state 192A). In an example embodiment, a pointer may be used to pass the state signature of the first device 174A and/or second device 174B to the guest driver 188A'. For example, the pointer may point to the location in memory of the saved state signature of the first device 174A. Additionally, the state signature of the second device 174B may also be saved in memory. Additionally, the guest driver 188A' may notify the guest OS 196' of the status of the state signature as mismatching.

Then, responsive to determining the status of the state signature as matching, the guest driver 188A' in the guest OS 196' executing on the second hypervisor 180B may load the device state 192A to the second device 174B after migration. For example, the device state 192A may be loaded to the second device 174B such that the second device 174B has the same device state as the first device 174A (e.g., device states 192A-D are the same). Then, the guest OS 196' may start using the second device 174B, which advantageously provides migration with minimum downtime when the assigned device 171B is unchanged (e.g., assigned device 171A and 171B are the same).

Conversely, responsive to determining the status of the state signature as mismatching, the guest OS 196' executing on the second hypervisor 180B may reinitialize the second device 174B on the second virtual machine 170D at the migration destination after migration. The state signature may mismatch between the first device 174A and the second device 174B if the devices have varying hardware and/or firmware versions. For example, the assigned device 171A associated with the first device 174A may be a PCI card with a firmware version of 10.1BB and the assigned device 171B may be a PCI card with a firmware version of 10.1A, in which case the state signatures between the first device 174A and the second device 174B may not match. To account for this mismatch, the second device 174B may be reinitialized so that the migrated system runs properly and the guest OS 196' may start using the second device 174B at the migration destination location, which advantageously prevents the guest OS 196' from crashing and provides a full functionality migration with an assigned device 171B (at the migration destination location) that differs from the assigned device 171A (at the migration source location).

Figure 4:
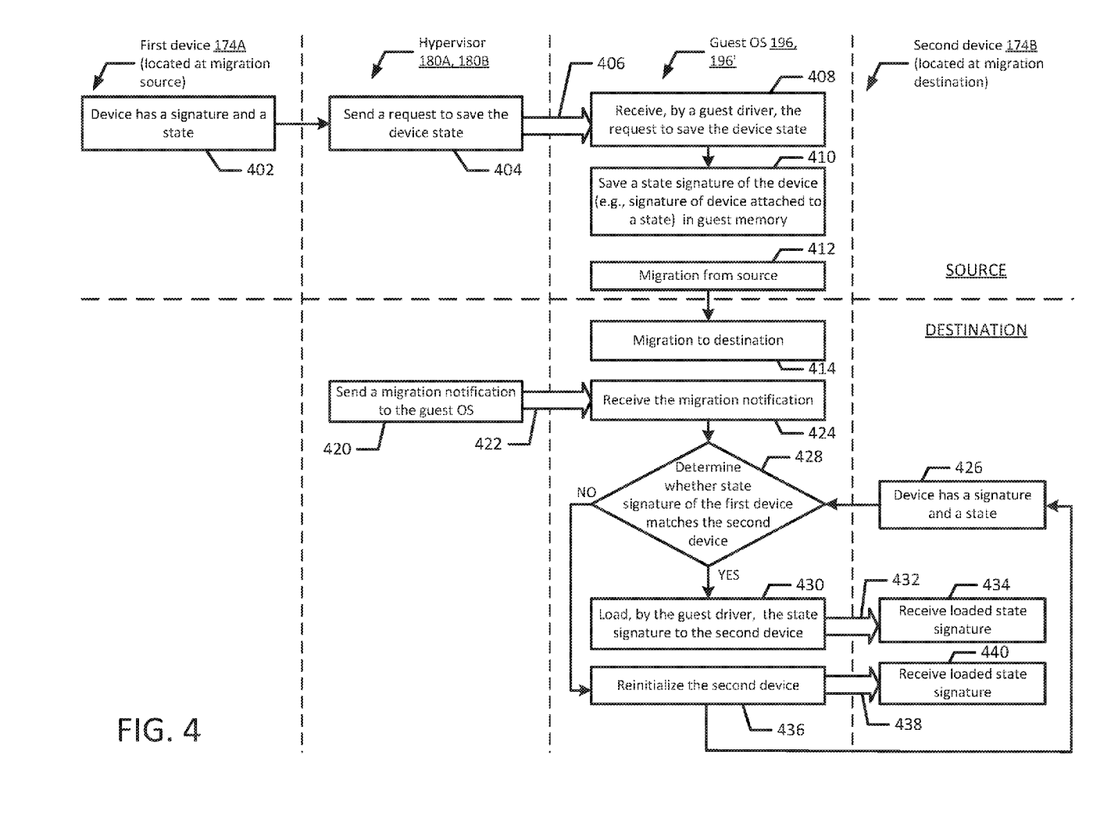
FIG. 4 illustrates a flow diagram of an example process for virtual machine migration according to an example embodiment of the present disclosure.

FIG. 4 depicts a flow diagram illustrating an example method 400 for virtual machine migration according to an example embodiment of the present disclosure. Although the example method 400 is described with reference to the flow diagram illustrated in FIG. 4, it will be appreciated that many other methods of performing the acts associated with the method may be used. For example, the order of some of the blocks may be changed, certain blocks may be combined with other blocks, and some of the blocks described are optional. The method may be performed by processing logic that may comprise (e.g., circuity, dedicated logic, etc.), software, or a combination of both.

In the illustrated example embodiment, a first device 174A may include a device signature 191A and a device state 192A (block 402). Device state 192A may be associated with or may be the same as the device state 192B of the assigned device 171A. In an example embodiment, the device signature 191A may include a unique identifier such as a random number, a token, or a text string. For example, the device signature 191A may be 0x1e9702 or may be a MAC Address. Additionally, the device signature 191A may include a hardware device ID, a firmware device ID, a vendor ID and/or a version. The device signature may also include a hash function, a list of loaded firmware, memory size, etc. A hypervisor 180A may send a request to save the device state 192A to a guest OS 196 (blocks 404 and 406). For example, the hypervisor 180A at a migration source location may send a request to save the device state 192A from a first device 174A. In an example embodiment, a device state may include information about the device such as the CPU state, registers, non-pageable memory used by the device, where the device is located, etc. Responsive to the hypervisor 180A sending the request, the guest OS 196 may receive the request to save the device state 192A (block 408). In an example embodiment, the request to save the device state 192A may be a message and/or instructions received by the guest OS 196. For example, the guest OS 196 may receive a request to save the device state 192A of the first device 174A associated with the assigned device 171A. In another example embodiment, the guest OS 196 may receive a request and/or multiple requests to save device states for multiple pass-through devices associated (e.g., multiple pass-through devices in a virtual machine).

Then, the guest OS 196 may save a state signature of the first device 174A in memory (e.g., guest memory 195A) (block 410). In an example embodiment, the state signature may be the device signature 191A attached to the device state 192A and/or device state 192B. For example, the state signature may include information associated with the device's memory, storage, and network connectivity. Additionally, the state signature may include hardware, firmware, vendor and/or version information. Then, the guest OS 196 may migrate from the source to the destination (blocks 412 to 414). For example, the guest OS 196 may move to a different physical machine, at the migration destination location. The migrated virtual machine 170D may include guest OS 196' (e.g., guest OS at the migration location) and may run on the underlying host OS 186B. In an example embodiment, the host OS 186B may be similar to host OS 186A. In another example embodiment, the host OS 186B may be identical to host OS 186A. In yet another example embodiment, the host OS 186B may be the same as host OS 186A (e.g., same host on the same physical machine).

The hypervisor 180B may send a migration notification to the guest OS 196' (blocks 420 and 422). In an example embodiment, the hypervisor 180B may detect that a virtual machine (e.g., virtual machine 170A) and/or a guest OS (e.g., guest OS 196) has migrated to the migration destination location. For example virtual machine 170D may be the migrated version of virtual machine 170A (e.g., the virtual machine resumed on the migration destination location). In an example embodiment, the guest OS 196' may unbind the guest driver 188A' in the guest OS 196' executing on the second hypervisor 180B from the first device 174A. For example, the guest driver 188A' may be associated with the first device 174A and the assigned device 171A. Once the system migrates the virtual machine 170A to the migration destination location, the assigned device 171A may no longer have reason to be bound to guest driver 188A'. Responsive to the hypervisor 180B sending the migration notification, the guest OS 196' may receive the migration notification (block 424). For example, the guest OS 196' may receive the notification or the guest driver 188A' (e.g., migrated guest driver) may receive the notification. In an example embodiment, the migration notification may include instructions to perform additional operations after migration.

A second device 174B with a device signature 191B and a device state 192C may be located at the migration destination (block 426). For example, the second device 174B may be a virtual device associated with assigned device 171B. The second device 174B may serve as a pass-through device for the hypervisor 180B. The device state 192C may be the same as the device state 192D. Then, the guest OS 196' may determine whether the state signature of the first device 174A matches the second device 174B (block 428). In another example embodiment, the guest driver 188A' may determine whether the state signature of the first device 174A matches the second device 174B. For example, the guest driver 188A' may check the state signature of the second device 174B against the state signature of the first device 174A (e.g., device signature 191A and device state 192A). In an example embodiment, a pointer may be used to pass the state signature of the first device 174A and/or second device 174B to the guest driver 188A'. For example, the pointer may point to the location in memory of the saved state signature of the first device 174A. Additionally, the state signature of the second device 174B may also be saved in memory.

If the state signature of the first device 174A matches the second device 174B, the guest OS 196' may load the state signature to the second device 174B (blocks 430 and 432). For example, the guest driver 188A' may load the state signature to the second device 174B. Then, the second device 174B may receive the loaded state signature (block 434). For example, the device state 192A may be loaded to the second device 174B such that the second device 174B has the same device state as the first device 174A (e.g., devices signatures 192A-D are the same). Then, the guest OS 196' may start using the second device 174B, which advantageously provides migration with minimum downtime when the assigned device 171B is unchanged (e.g., assigned device 171A and 171B are the same). In an example embodiment, the guest OS 196' executing on the second hypervisor 170D may bind the guest driver 188A' to the second device 174B. For example, in the case of matching, the guest OS 196' may bind guest driver 188A' to the second device 174A (associated with assigned device 171A) because the guest driver 188A' (e.g., migrated driver 188A) is configured to work with the second devices (e.g., second device 174B and assigned device 171B) because they have matching state signatures with the original devices (e.g., first device 174A and assigned device 171A). Additionally, the guest OS 196' executing on the second hypervisor 170D may bind a different driver to the second device 174A. For example, the guest OS 196' may decide to use a driver that is compatible with multiple devices.

If the state signature of the first device 174A does not match the second device 174B, the guest OS 196' may reinitialize the second device (block 436). The state signature may mismatch between the first device 174A and the second device 174B if the devices have varying hardware and/or firmware versions. For example, the assigned device 171A associated with the first device 174A may be a PCI card with a firmware version of 10.1BB and the assigned device 171B may be a PCI card with a firmware version of 10.1A, in which case the state signatures between the first device 174A and the second device 174B may not match. To account for this mismatch, the second device 174B may be reinitialized to prevent the guest OS 196' from crashing and to ensure that the migrated system runs properly. The guest OS 196' may start using the second device 174B at the migration destination location, which advantageously allows a full functionality migration with an assigned device 171B (at the migration destination location) that differs from the assigned device 171A (at the migration source location).

In an example embodiment, the guest OS 196' may bind a different driver in the case of mismatching to ensure that the proper guest driver is used with the second device 174B and the associated assigned device 171B. In another example embodiment, the guest OS 196' executing on the second hypervisor 170D may unload the guest driver 188A' from memory (e.g., guest memory 195B). For example, on mismatch, a different guest driver may be used and the guest OS 196' may load the different guest driver in the memory (e.g., guest memory 195B). Then, the guest driver may be used with the second device 174B and the associated assigned device 171B.

Figure 5:
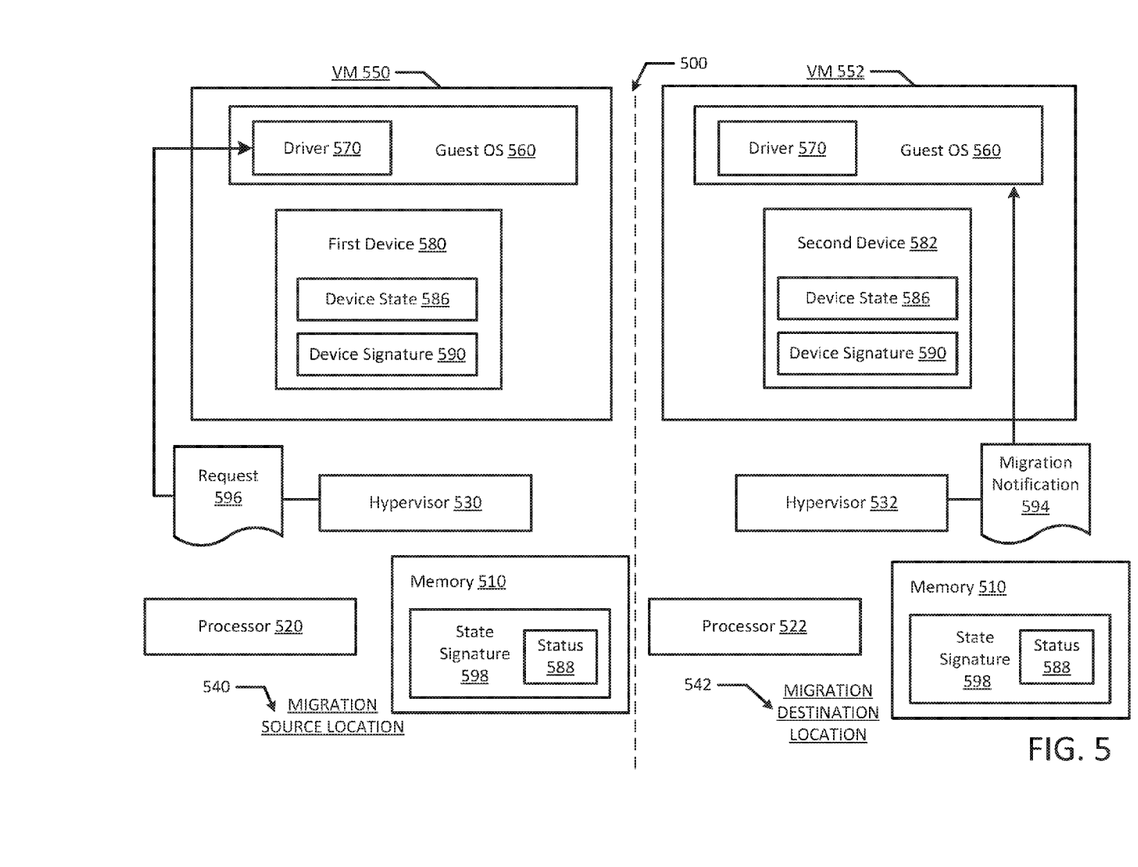
FIG. 5 illustrates a block diagram of an example migration system according to an example embodiment of the present disclosure.

FIG. 5 is a block diagram of an example migration system 500 according to an example embodiment of the present disclosure. The migration system 500 may include a memory 510 and one or more physical processors (e.g., processor 520 and 522) in communication with the memory 510. The migration system 500 may include a first device 580 and a second device 582. The migration system 500 may include a first hypervisor 530 executing on the one or more physical processors (e.g., processor 520). The first hypervisor 530 may be located at a migration source location 540. The migration system 500 may further include a second hypervisor 532 executing on the one or more physical processors (e.g., processor 522). The second hypervisor 532 may be located at a migration destination location 542. The migration system 500 may include a first virtual machine 550. The first virtual machine 550 may include, before migration, a guest OS 560 executing on the first hypervisor 530. The first virtual machine 550 may also include a guest driver 570 in the guest OS 560 executing on the first hypervisor 530. The migration system 500 may further include a second virtual machine 552. The second virtual machine 552 may include, after migration, the guest OS 560 executing on the second hypervisor 532. The second virtual machine 552 may also include the guest driver 570 in the guest OS 560 executing on the second hypervisor 532. The first hypervisor 530 may execute on the one or more physical processors (e.g., processor 520) to send a request 596 to save a device state 586 to the guest driver 570 in the guest OS 560 executing on the first hypervisor 530. The device state 586 may be associated with the first device 580 on the first virtual machine 550. The second hypervisor 532 may execute on the one or more processors (e.g., processor 522) to send a migration notification 594 to the guest OS 560 executing on the second hypervisor 532. The guest driver 570 in the guest OS 560 executing on the first hypervisor 530 may receive the request 596 from the first hypervisor 530 and may save a state signature 598 in the memory 510. The state signature 598 may include a device signature 590 attached to the device state 586 of the first device 580. The guest driver 570 in the guest OS 560 executing on the second hypervisor 532 may determine a status 588 of the state signature 598 as one of matching the second device 582 and mismatching the second device 582.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory;
one or more physical processors, in communication with the memory;
a first device;
a second device;
a first hypervisor executing on the one or more physical processors, wherein the first hypervisor is located at a migration source location;
a second hypervisor executing on the one or more physical processors, wherein the second hypervisor is located at a migration destination location;
a first virtual machine including, before migration, a guest OS executing on the first hypervisor and a guest driver in the guest OS executing on the first hypervisor; and
a second virtual machine including, after migration, the guest OS executing on the second hypervisor and the guest driver in the guest OS executing on the second hypervisor,
wherein the first hypervisor executes on the one or more physical processors to send a request to save a device state to the guest driver in the guest OS executing on the first hypervisor, wherein the device state is associated with the first device on the first virtual machine,
wherein the second hypervisor executes on the one or more physical processors to send a migration notification to the guest OS executing on the second hypervisor,
wherein the guest driver in the guest OS executing on the first hypervisor
receives the request from the first hypervisor, and
saves a state signature in the memory, wherein the state signature includes a device signature of the first device attached to the device state of the first device, and
wherein the guest driver in the guest OS executing on the second hypervisor determines a status of the state signature as one of matching the second device and mismatching the second device.

2. The system of claim 1, wherein responsive to determining the status of the state signature as matching the second device, the guest driver in the guest OS executing on the second hypervisor loads the device state to the second device.

3. The system of claim 1, wherein the guest OS executes on the second hypervisor to unbind the guest driver in the guest OS executing on the second hypervisor from the first device, and the guest OS executes on the second hypervisor to bind the guest driver in the guest OS executing on the second hypervisor to the second device.

4. The system of claim 1, wherein responsive to determining the status of the state signature as mismatching the second device, the guest driver in the guest OS operating on the second hypervisor notifies the guest OS executing on the second hypervisor of the status of the state signature as mismatching.

5. The system of claim 4, wherein responsive to determining the status of the state signature as mismatching the second device, the guest OS executes on the second hypervisor to reinitialize the second device on the second virtual machine at the migration destination.

6. The system of claim 4, wherein the guest OS executes on the second hypervisor to:
unload the guest driver in the guest OS executing on the second hypervisor from the memory; and
load a different guest driver in the guest OS executing on the second hypervisor in the memory.

7. The system of claim 1, wherein the signature of the first device includes at least one of a hardware device ID, a firmware device ID, a vendor ID, and a version.

8. The system of claim 1, wherein the signature of the first device includes at least one of a hash function, a list of loaded firmware, and a memory size.

9. The system of claim 1, wherein a pointer is used to pass the state signature to the guest driver in the guest OS executing on the second hypervisor, wherein the pointer points to the location in the memory of the saved state signature.

10. The system of claim 1, wherein the first hypervisor and the second hypervisor are the same.

11. A method comprising:
sending, before migration, by a first hypervisor, a request to save a device state to a guest driver in a guest OS executing on the first hypervisor, wherein
the device state is associated with a first device on a first virtual machine, and
the first virtual machine is located at a migration source location;
receiving, before migration, by the guest driver in the guest OS executing on the first hypervisor, the request from the first hypervisor;
responsive to receiving the request, saving, before migration, by the guest driver in the guest OS executing on the first hypervisor, a state signature in a first memory, wherein the state signature includes a device signature of the first device attached to the device state;
sending, after migration, by a second hypervisor, a migration notification to a guest OS executing on the second hypervisor;
receiving, after migration, by the guest OS executing on the second hypervisor, the migration notification; and
determining, after migration, by the guest driver in the guest OS executing on the second hypervisor, whether the state signature is a match or a mismatch with a second device on a second virtual machine.

12. The method of claim 11, further comprising responsive to determining the state signature matches, loading, after migration, by the guest driver in the guest OS executing on the second hypervisor, the device state to the second device.

13. The method of claim 11, further comprising responsive to determining the state signature mismatches the second device, notifying, after migration, by the guest driver in the guest OS executing on the second hypervisor, the guest OS executing on the second hypervisor that the state signature mismatches.

14. The method of claim 13, further comprising responsive to determining the state signature mismatches the second device, reinitializing, after migration, by the guest OS executing on the second hypervisor, the second device on the second virtual machine at the migration destination.

15. The method of claim 13, further comprising:
unloading, after migration, by the guest OS executing on the second hypervisor, the guest driver in the guest OS executing on the first hypervisor from the first memory, and
loading, after migration, by the guest OS executing on the second hypervisor, a different guest driver in a second memory.

16. The method of claim 13, further comprising unbinding, after migration, by the guest OS executing on the second hypervisor, the guest driver in the guest OS executing on the second hypervisor from the first device.

17. The method of claim 13, further comprising binding, after migration, by the guest OS executing on the second hypervisor, the guest driver in the guest OS executing on the second hypervisor to the second device.

18. The method of claim 11, wherein the signature of the first device includes at least one of a hardware device ID, a firmware device ID, a vendor ID, a version, a hash function, a list of loaded firmware, and a memory size.

19. The method of claim 11, wherein a pointer is used to pass the state signature to the guest driver in the guest OS executing on the second hypervisor, wherein the pointer points to the location in the first memory of the saved state signature.

20. A non-transitory machine readable medium storing a program, which when executed by a processor, causes a guest OS including a guest driver to:
receive, before migration, by a guest driver in the guest OS executing on a first hypervisor, a request from the first hypervisor to save a device state, wherein
the device state is associated with a first device on the first virtual machine, and
the first virtual machine is located at a migration source location, and
save, before migration, by the guest driver in the guest OS executing on a first hypervisor, a state signature of the first device in a first memory, wherein the state signature includes a device signature attached to the device state;
receive, after migration, by the guest OS executing on a second hypervisor, a migration notification from the second hypervisor;
determine, after migration, by the guest driver in the guest OS executing on the second hypervisor, a status of the state signature as one of matching and mismatching with a second device on a second virtual machine, wherein
the second virtual machine is located at a migration destination location,
responsive to determining the status of the state signature as matching, the guest driver in the guest OS executing on the second hypervisor loads, after migration, the device state to the second device, and
responsive to determining the status of the state signature as mismatching, the guest OS executing on the second hypervisor reinitializes, after migration, the second device on the second virtual machine at the migration destination.

* * * * *